United States Patent Office 2,776,269
Patented Jan. 1, 1957

2,776,269

SELF-CURING SYNTHETIC RUBBER

Herbert E. Pleuss, Manitowoc, Wis., assignor to Heresite & Chemical Company, a corporation of Wisconsin No Drawing. Application December 19, 1952,
Serial No. 327,047

4 Claims. (Cl. 260—23.7)

This invention relates to synthetic rubber and more particularly to a self-curing synthetic rubber.

This application is a continuation-in-part of my copending application, Serial No. 56,674, filed October 26, 1948, now abandoned.

The corrosion-resistant properties of synthetic rubber are well known. It has been the practice in the past to apply coatings of synthetic rubber to the interior of containers adapted to contain corrosive fluids such as acids and the like. One procedure has been to spray a plurality of coats of synthetic rubber on the interior of the container with each coat being subjected to an intermediate baking step in order to build up a layer of synthetic rubber of sufficient thickness. Sprayable synthetic rubber compositions, such as the composition shown in the application of Charles H. Hempel, Serial No. 687,967, filed August 2, 1946, now abandoned, while possessing a high degree of corrosion resistance, are applied by spraying in comparatively thin layers. Thus it becomes necessary to repeat the spraying operation a number of times in order to build up a layer of synthetic rubber of sufficient thickness. It is also necessary to cure each of the applied coats by baking in order to form the final coating.

I have invented a synthetic rubber compound which may be milled and rolled out in sheet form and then applied directly to the interior of a container. The compound of this invention is self-curing in that it is not necessary to apply heat after the application of the compound and the compound will in time become cured. The period required for curing will, of course, vary with the temperature to which the compound is subjected, but if left to stand for several weeks at room temperature it will become completely cured. I prefer, however, to permit the self-curing to proceed about three or four days until the compound has reached the proper condition and then to accelerate and complete the curing by applying heat.

The compound is particularly adaptable for use with the synthetic rubber prepared by the process described in the application of Charles H. Hempel, Serial No. 725,255, filed on January 30, 1947, and issued on April 19, 1949, as U. S. Patent No. 2,467,382. As therein described, the preferred formula is:

| | Parts by weight |
|---|---|
| Butadiene | 75 |
| Acrylonitrile or styrene | 25 |
| Water | 120 |
| Soap | 14 |
| Sodium hydroxide | 1 |
| Potassium persulfate | 2 |
| Benzol | 15 |

The proportion of butadiene to styrene or acrylonitrile may be varied within the limits of from 1 to 1, to 9 to 1 parts by weight. In carrying out the process described in said application, a solution of common soap is made by adding soap in the proportion designated to warm water and agitating vigorously until the soap is completely dissolved and the solution is cooled. To this is added the styrene (or acrylonitrile), the styrene having been extracted with sodium hydroxide solution to remove the inhibitor, and the mixture is again agitated vigorously for about ten minutes. Then the sodium hydroxide, potassium persulfate, and benzol are added together and agitated for about fifteen minutes. This emulsion is pumped into a pot equipped with an efficient agitator and built to withstand the required pressure. The pot is also equipped with a pressure gauge and a thermometer. To this is added the butadiene, and the mixture under agitation is heated. The temperature should be held carefully between 36° C. and 40° C. The pot is closed and the above temperatures will generate a pressure within the pot of about 45 pounds per square inch, the particular pressure generated depending upon the temperature and somewhat on the reacting ingredients. The pressure will drop to zero in about 23 hours, signifying the completion of the reaction. Upon completion of the reaction, a white liquid is obtained which may be called a latex milk, as it looks similar to caoutchouc latex.

After the copolymerizate produced by the method described in the said patent has been coagulated, washed and dried, I then thoroughly mix 100 to 150 parts by weight of a pigment, 2 to 20 parts by weight of a plasticizer, 1 to 5 parts by weight of an activator, and 12 to 24 parts by weight of a combination of a vulcanizer and an accelerator with at least 14% by weight of the combination being a vulcanizer and at least 33% by weight of the combination being an accelerator. The mixing is preferably carried on in a standard rubber mill and after the compounds have been thoroughly mixed they are sheeted out on the mill to sheets of the desired thickness. I find that a thickness of 1/8" to 3/16" is sufficiently thick for protective purposes and yet thin enough to be handled easily.

The rubber sheet immediately after coming off the sheeting mill is quite soft and plastic and is then preferably wound on a liner or other suitable material to keep it clean and free from foreign materials until it is used.

The sheeted compound should be applied while it is still soft, preferably within 24 hours. As previously stated, the material is self-curing and it will progressively harden and become less suitable for proper application.

In applying a sheet of the synthetic rubber composition of this invention to an object to be coated, a cement of butadiene acrylonitrile copolymer dissolved in a solvent such as methyl isobutyl ketone, for example, (U. S. Rubber Cement 6136), is applied to the object and I also prefer to apply a coat of such cement to one side of the rubber composition. If the surface being coated is steel, it should be clean and dry. This is best accomplished by sand blasting. When the cement becomes tacky, the rubber compound is pressed upon the surface and rolled and molded into place. As the rubber sheet is extremely plastic and soft at this time, the rolling and molding operations are quite simple and the sheet adheres very tightly to the surface. The lining can be applied to surfaces other than steel, for example, wood, with which a similar procedure may be followed.

Another example of cement which may be employed is that formed by dissolving the compound of Example I, in methyl isobutyl ketone to form a 10% to 15% solution.

The coated object should then be allowed to stand. At room temperatures the lining will completely self-cure within a maximum period of about 14 days. However, I prefer to allow the object to set at room temperatures for approximately 4 days and at least for 48 hours, at which time the coating will be partially cured.

This four-day period may be lengthened or shortened depending upon the temperature to which the rubber compound is subjected. In any event, when the compound has lost a good deal of its plasticity so that it can no longer be dented by normal finger pressure, a practice common in the art, the self-cure has advanced to the proper stage for acceleration. When the compound has reached this stage I prefer to accelerate and complete the curing process by subjecting the compound to a temperature of about 140° F. for from 2 to 12 hours. After this heating period the compound will be completely cured and the object ready for use. If heat is applied to the compound before it is partially self-cured to the proper state described above, the application of such heat will cause lifting or blistering and it is therefore important that the accelerated curing step by baking be delayed until the sheet is hard enough to withstand normal finger pressure without becoming dented.

While the invention may be used with copolymers of butadiene and styrene, I prefer to use a copolymer of butadiene and acrylonitrile as the latter seems to give better results.

Carbon black is the preferred pigment although other pigments, such as silica, calcium silicate, magnesium silicate, ochre, sienna, titanium dioxide, lithopone, calcium sulfate, barium sulfate, clay (kaolin), mica, pyrophylite and the like have been used with success. I do not know of any pigments of common knowledge in the art which will not work.

The preferred vulcanizing agent is sulfur, although selenium dimethyl dithiocarbamate, and selenium diethyl dithiocarbamate may also be used. Any of the commonly known plasticizers for synthetic rubber can be used in the process of this invention. For example, I have successfully used such well known plasticizers as mineral oil, pine tar, burgundy pitch, rosin oil, paraffin oil, stearic acid, oleic acid, processed castor oil, dibutyl sebacate, dibenzyl sebacate, dicapryl phthalate, tributoxy ethyl phosphate, butoxy ethyl stearate, tricresyl phosphate, dibutyl phthalate, and dioctyl phthalate with success.

Zinc oxide is the preferred activator for use in the process although magnesium oxide, litharge, and lime (calcium oxide) have been used successfully. I do not know of any activators of common knowledge in the art which will not work.

Any of the accelerators of common knowledge in the art may be employed in my process. I have used such accelerators as 2-mercaptobenzothiazole, 2,2'benzothiazyl disulfide, tetraethyl thiuram disulfide, tetramethyl thiuram disulfide, zinc dimethyl dithiocarbamate, zinc diethyl dithiocarbamate, zinc dibutyl dithiocarbamate, copper diethyl dithiocarbamate, selenium dimethyl dithiocarbamate, selenium diethyl dithiocarbamate, lead dimethyl dithiocarbamate, diothotolylguanidine, and diphenylguanidine.

For specific examples of the process I have prepared copolymers of butadiene and acrylonitrile in accordance with the process of Hempel U. S. Patent No. 2,467,382. The copolymerizate is then coagulated, washed and dried and then mixed as follows:

*Example I*

| | Parts by weight |
|---|---|
| Copolymer | 100 |
| Furnace black | 100 |
| Sulfur | 10 |
| Pine tar | 20 |
| Zinc oxide | 5 |
| Mercaptobenzothiazole | 4 |
| Zinc dimethyl dithiocarbamate | 2.5 |

The compounds were thoroughly blended together on a rubber mill and then rolled out in sheet form as previously described.

As a second example of the process of the copolymer of Example I was mixed as follows:

*Example II*

| | Parts by weight |
|---|---|
| Copolymer | 100 |
| Furnace black | 100 |
| Sulfur | 15 |
| Stearic acid | 2 |
| Dioctyl phthalate | 10 |
| Zinc oxide | 5 |
| Benzothiazyl disulfide | 3.5 |
| Zinc diethyl dithiocarbamate | 1.5 |

The resulting compound after being mixed on a rubber mill was rolled out in sheet form.

A third example is as follows:

*Example III*

| | Parts by weight |
|---|---|
| Copolymer | 100 |
| Furnace black | 100 |
| Thermal black | 50 |
| Sulfur | 15 |
| Stearic acid | 5 |
| Dibutyl phthalate | 5 |
| Paraffin oil | 7 |
| Zinc oxide | 5 |
| Benzothiazyl disulfide | 2.5 |
| Copper diethyl dithiocarbamate | 0.5 |
| Selenium diethyl dithiocarbamate | 2.5 |

The compounds were mixed and sheeted as described.

All of the sheets formed in the above examples exhibit the previously described self-curing property and were applicable as a soft, plastic, easily molded sheet to a container either of steel or wood. All of the sheets when applied with a rubber cement of the types previously described, had excellent adhesion.

Linings of different degrees of hardness from Shore A–50 to hard rubber (ebonite) may be obtained by proper choice and proportioning of the ingredients. Such variations in the proportions will, of course, effect the time of self-cure but all sheets will self-cure within about 14 days at room temperatures and the cure of all may be accelerated as previously described when they have reached the proper stage as determined by the aforementioned finger pressure test.

As used throughout the claims and specification, the term "self-curing" refers to a synthetic rubber product which is self-vulcanizing at room temperature.

While I have described certain embodiments of my invention, it is my intention that the invention be not limited by any of the details given unless otherwise specified, but rather be construed broadly within its spirit and scope as set out in the accompanying claims.

I claim:

1. A sheet of synthetic rubber comprising a copolymer of from 1 to 9 parts by weight of butadiene, and one part by weight of a material copolymerizable therewith of the class consisting of styrene and acrylonitrile, each 100 parts by weight of said copolymer being mixed with a pigment, a vulcanizer, a plasticizer, an activator, and an accelerator in such proportions as to render the sheet soft and plastic and having the property of being self-curing at room temperature within about 14 days, said proportions being within the ranges of 100 to 150 parts by weight of a pigment, 2 to 20 parts by weight of a plasticizer, 1 to 5 parts by weight of an activator and 12 to 24 parts by weight of a combination of a vulcanizer and an accelerator with at least 14% by weight of the combination being a vulcanizer and at least 33% by weight of the combination being an accelerator.

2. A self-curing synthetic mixture comprising 100 parts by weight of a copolymer of from 1 to 9 parts by weight of butadiene and one part by weight of a material copolymerizable therewith of the class consisting of styrene and acrylonitrile, 100 parts by weight of carbon black, 10 parts by weight of sulfur, 20 parts by weight of pine tar, 5 parts by weight of zinc oxide, 4 parts by weight of mercaptobenzothiazole, 2.5 parts by weight of zinc dimethyl dithiocarbamate.

3. A self-curing synthetic mixture comprising 100 parts by weight of a copolymer of from 1 to 9 parts by weight of butadiene and one part by weight of a material copolymerizable therewith of the class consisting of styrene and acrylonitrile, 100 parts by weight of carbon black, 15 parts by weight of sulfur, 2 parts by weight of stearic acid, 10 parts by weight of dioctyl phthalate, 5 parts by weight of zinc oxide, 3.5 parts by weight of benzothiazyl disulfide, and 1.5 parts by weight of zinc diethyl dithiocarbamate, said mixture being capable of complete self-curing at room temperature within about 14 days.

4. A self-curing synthetic mixture comprising 100 parts by weight of a copolymer of from 1 to 9 parts by weight of butadiene and one part by weight of a material copolymerizable therewith of the class consisting of styrene and acrylonitrile, 100 parts by weight of furnace black, 50 parts by weight of carbon black, 15 parts by weight of sulfur, 5 parts by weight of stearic acid, 5 parts by weight of dibutyl phthalate, 7 parts by weight of paraffin oil, 5 parts by weight of zinc oxide, 2.5 parts by weight of benzothiazyl disulfide, 0.5 parts by weight of copper diethyl diethiocarbamate and 2.5 parts by weight of selenium diethyl dithiocarbamate, said mixture being capable of complete self-curing at room temperature within about 14 days.

References Cited in the file of this patent

UNITED STATES PATENTS

| | | |
|---|---|---|
| 2,374,843 | Somerville | May 1, 1945 |
| 2,395,071 | Sarbach | Feb. 19, 1946 |
| 2,396,967 | Phillips | Mar. 19, 1946 |
| 2,399,945 | Somerville | May 7, 1946 |
| 2,476,819 | Draman | July 19, 1949 |

OTHER REFERENCES

Vanderbilt Rubber Handbook, 1948, page 191.

Barron: "Modern Synthetic Rubbers," Chapman and Hall Ltd., London, 1949, pages 249–250.

Vanderbilt Rubber Handbook, 1948, pages 222–224.